US007452122B2

(12) United States Patent
Lin

(10) Patent No.: US 7,452,122 B2
(45) Date of Patent: Nov. 18, 2008

(54) FEEDER DEVICE

(75) Inventor: Shawn H Lin, Atlanta, GA (US)

(73) Assignee: Bio-Lab, Inc., Lawrenceville, GA (US)

( * ) Notice: Subject to any disclaimer, the term of this patent is extended or adjusted under 35 U.S.C. 154(b) by 384 days.

(21) Appl. No.: 10/939,131

(22) Filed: Sep. 10, 2004

(65) Prior Publication Data

US 2005/0139539 A1 Jun. 30, 2005

Related U.S. Application Data

(60) Provisional application No. 60/489,880, filed on Jul. 23, 2003, provisional application No. 60/502,697, filed on Sep. 12, 2003.

(51) Int. Cl.
*B01F 15/02* (2006.01)
*B01D 11/00* (2006.01)

(52) U.S. Cl. .................................... 366/167.1; 422/278

(58) Field of Classification Search .............. 366/167.1; 422/277, 278

See application file for complete search history.

(56) References Cited

U.S. PATENT DOCUMENTS 85,375 A * 12/1868 Boileau ....................... 74/561
1,321,037 A * 11/1919 Hendrick .................... 422/274
1,335,802 A * 4/1920 Stewart ....................... 422/282
2,142,947 A * 1/1939 Kretzschmar et al. .......... 239/10
2,758,877 A * 8/1956 Gleason ....................... 422/113
3,595,395 A * 7/1971 Lorenzen ............... 210/167.11
3,772,193 A * 11/1973 Nelli et al. .................. 210/756
4,407,322 A * 10/1983 Moore et al. ................ 137/268
5,218,983 A * 6/1993 King .......................... 422/282
5,384,102 A * 1/1995 Ferguson et al. ............ 422/264
5,419,355 A * 5/1995 Brennan et al. ................ 137/1
5,427,748 A * 6/1995 Wiedrich et al. ............ 422/284
5,441,073 A * 8/1995 Hoadley ...................... 137/268
5,441,711 A * 8/1995 Drewery ..................... 422/264
5,810,043 A * 9/1998 Grenier ...................... 137/268
5,928,608 A * 7/1999 Levesque et al. .............. 422/37
5,993,753 A * 11/1999 Davidson .................... 422/275
6,077,484 A * 6/2000 Graves ....................... 422/277
6,451,271 B1 * 9/2002 Hammonds ................. 422/264
7,081,232 B1 * 7/2006 Dooley et al. ............... 422/261
2005/0139593 A1 * 6/2005 Lin ............................ 210/405

* cited by examiner

*Primary Examiner*—Tony G Soohoo
(74) *Attorney, Agent, or Firm*—James Sher

(57) ABSTRACT

The feeder apparatus including a chamber formed of at least one upstanding wall, a water outlet in the wall, a drain in the wall, the chamber having a bottom, inlets for water jets in the bottom for creating turbulence inside the chamber to create particle suspension and/or to increase chemicals solubility, or a perforated plate inside of the chamber and spaced from the bottom of the chamber to permit water to flow underneath and up through perforations in the plate and into the chamber.

3 Claims, 3 Drawing Sheets

FEEDER DEVICE

REFERENCE TO A RELATED APPLICATION

This application claims the benefit of my provisional applications 60/489,880 filed Jul. 23, 2003 and 60/502,697 filed Sep. 12, 2003, and my copending non-provisional application 10/895,746 filed Jul. 21, 2004 which are relied on and incorporated herein by reference.

INTRODUCTION AND BACKGROUND

The present invention relates to a new apparatus for feeding any type of solid, liquid or gel products into water to form a blended formulation. More particularly, the present invention relates to a feeder apparatus for solubilizing a solid, granular or powdered form of chemicals to create solutions for a variety of purposes. The apparatus of the present invention can also be used for blending different liquids or a gel with a liquid. According to the present invention, there is provided a modular system for conveniently forming blended compositions useful for many applications.

SUMMARY OF THE INVENTION

The present invention provides a modular system comprising one or more stackable units wherein each unit is in the form of a generally cylindrically shaped container fitted with a plurality of openings to permit water inflow and outflow. Thus, a single unit or a plurality of units can be used in accordance with the present invention. The typical unit has an opening at its top for charging a material, such as a solid granular or powdered chemical into the chamber. Liquids or gels can also be added to the chamber this way. The device has a water-inlet distribution configuration such that a circulating upward turbulent flow of water is provided by a jet action to meet with and blend with the downwardly descending material. Thus, if a chemical is introduced, the upward turbulent flow will solubilize the chemical to form a solution. In the same way, depending on the material introduced at the top of the unit, a suspension, dispersion or gel will be formed for discharge from the unit.

BRIEF DESCRIPTION OF THE DRAWINGS

The invention will be further understood with reference to the drawings; wherein.

DETAILED DESCRIPTION OF THE INVENTION

Figure 1:
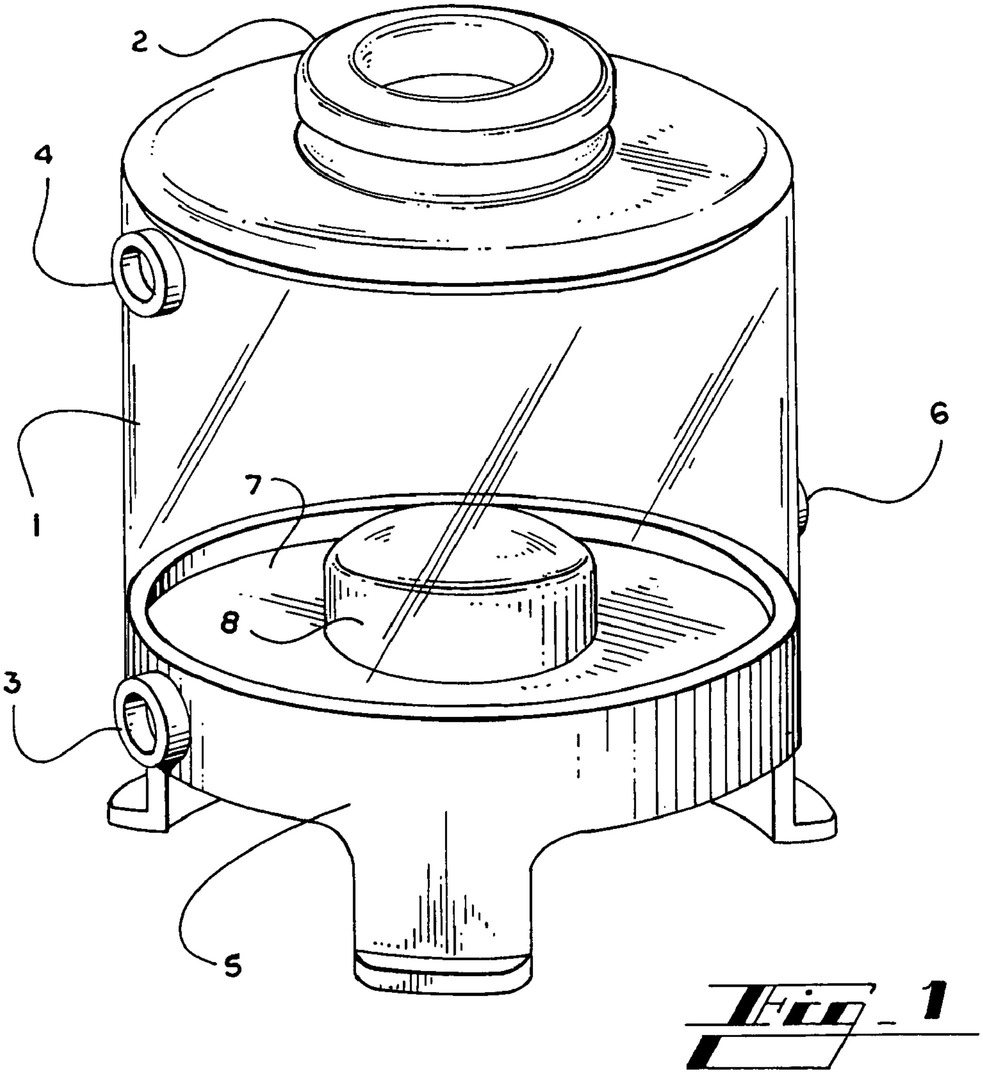
FIG. 1 is a perspective view of the feeder apparatus of the invention.

In FIG. 1, there is shown the single modular chamber or tank 1, formed of an upstanding cylindrical wall and having a removable cover 2 adapted to fit in water tight fashion to the top of chamber 1, and a water inlet 3, connected with a source of water (not shown). Conventional flow meters and solenoid valves (not shown) can be connected with the apparatus and function to control water flow and to turn the water flow on and off in the conventional way. The flow of water is adjustable and can be set according to the material introduced at the top. Piping of any convenient type (not shown) connects the source of water to the inlet 3. The chamber 1 has a water outlet 4 located adjacent the top edge of the chamber for discharging the resulting composition from the chamber and for using the resulting composition for its intended purpose, such as the treated water for a swimming pool. The chamber 1 has a base 5 and can be conveniently fastened to any convenient support (not shown) of any desired or conventional size or shape.

In a preferred embodiment, the feeder apparatus of the invention includes a transparent unit container chamber or tank 1, generally in the shape of a right cylinder. The removable cover 2 is in mating engagement with the top edge of the unit either by clamping or screw threads in order to present a water tight and pressure tight seal for the unit. A water inlet 3 at the bottom of the unit and water outlet 4 located proximate the upper edge of the unit provide for ingress and egress of water. A drain 6 is provided for draining and for cleaning the apparatus at appropriate intervals.

The untreated water inlet 3 is directly connected to and in communication with a centrally located hollow cylindrical hub 7 which is fitted in the base 5 of the tank 1. Water flows from the water inlet 3 directly into the hub 7 without first flowing into the chamber 1. Thus, the water flow path of the device of this invention proceeds from the inlet 3 directly into the interior of the upstanding hub. For example, the water inlet 3 can enter the base 5 through a conduit and into the hub. From the interior of the hub 1, the water flow path then proceeds to exit the hub into the interior of the chamber 1 through a plurality of openings 8. The openings can be in the form of slits or nozzle shaped openings 8 forming a jet effect through which the untreated water is introduced in a jet stream into the chamber. The slits or nozzle shaped openings enable the entering water to be introduced as a jet stream resulting in an upwardly flowing turbulent water movement. The apparatus of the invention operates under pressure and can also operate at normal atmospheric pressure. The water inlet 3 is directly connected to the interior of the hub 6 so that the water that is introduced through water inlet 3 enters through a direct connection into the interior of the hub 7 and then is jetted out into the tank chamber through the plurality of slotted nozzle shaped openings 8. An optional screen (not shown) can be fitted into the tank near the top to prevent objects from falling into the tank when the tank is charged with the treating chemical.

In operation, the tank is first filled with untreated water through inlet 3 and after the tank is filled with water, the water flow is discontinued and the intended material, either dry, liquid or gel, can be introduced into the tank through the uncovered top of the tank. The cover of the tank is then put in place and secured to form a water tight seal which can also be pressure tight if desired. Water flow through the inlet 3 is then restarted once again to begin the blending process of the material. Thus, if a dry powder or granular material is used, as the chemical dissolves, the resulting solution is pumped out for its intended purpose, such as to pool or other circulating water system for a water treatment process. However, the apparatus of the present invention can be used for other purposes such as mixing agricultural chemicals with water to form sprays for crops.

Figure 2:
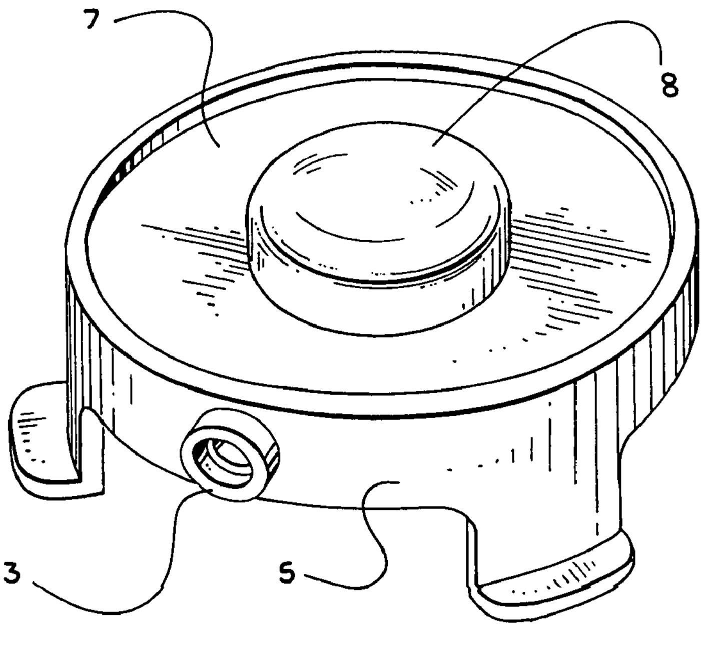
FIG. 2 is a perspective view of the base of the feeder apparatus of the invention.

FIG. 2 shows the base 5 with water inlet 3 to enable water to enter into the interior of the base. The water enters hub 7 from the interior of the base 5 and exits from a plurality of slit or nozzle openings 8 located uniformly around the circumference of the circular hub 7.

Figure 3:
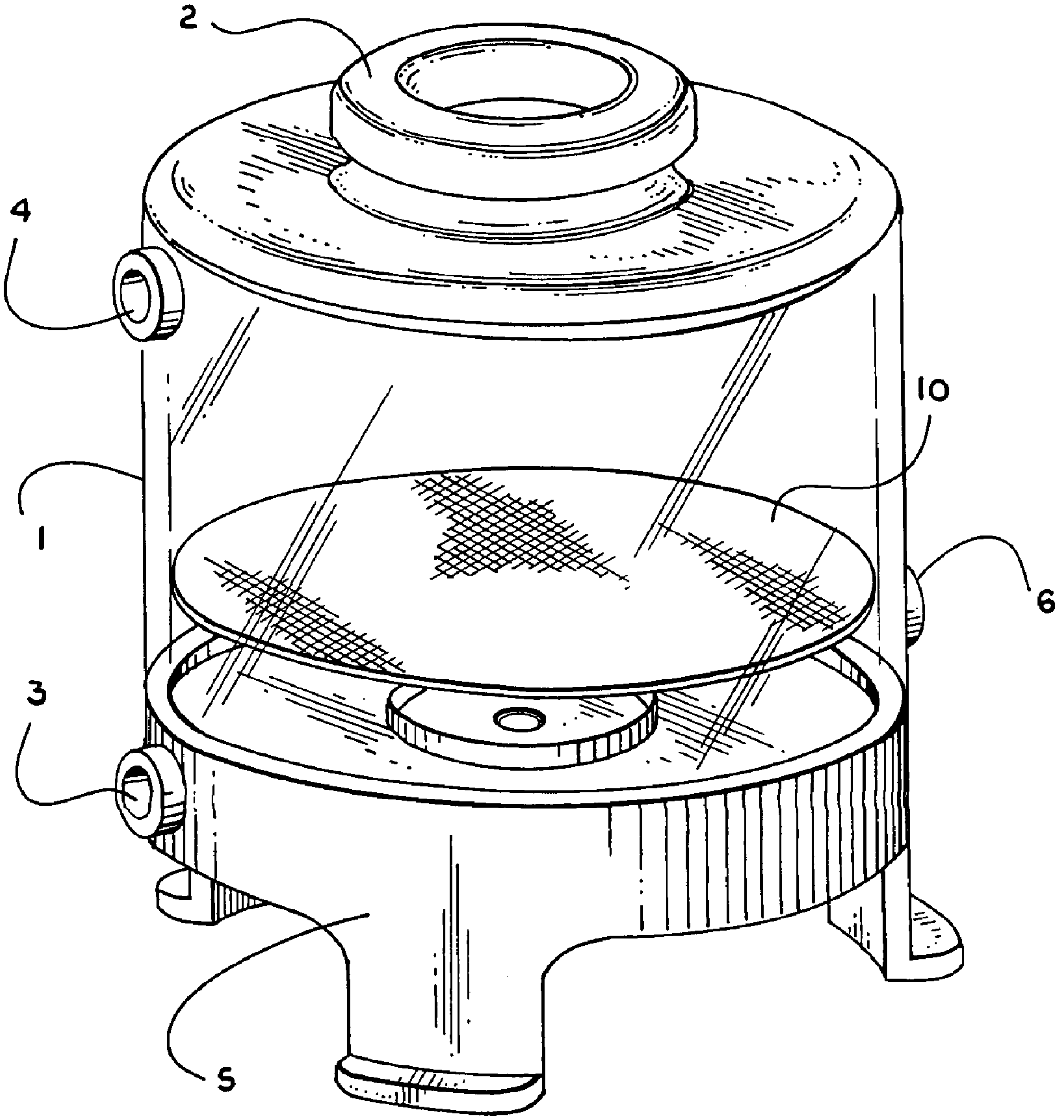
FIG. 3 is a perspective view of an alternative embodiment of the feeder apparatus of the invention.

In an alternative embodiment shown in FIG. 3, inside of chamber 1, there can be a grate or perforated plate 10 spaced from the bottom and supported by lugs, brackets or other supporting means which acts as a platform to retain any undissolved granular particles. In this embodiment, a perforated circular plate 10 replaces the hub shown in FIG. 1 for introduction of the untreated water into the apparatus of the invention. The plate 10 breaks up the water flow into a very slow upward moving stream. This alternative is more desirable for the applications that retain insoluble impurities in the feeder as needed.

When granules or particles tare used with the disclosed apparatus they can be about the size of crystallized sugar or one-third the size of a grain of rice. The size can vary as desired. The openings on the grate are dimensioned so as to retain the solid granules. Examples of granules include a variety of water treatment chemicals including calcium hypochlorite, BCDMH, TCCA, CYA, sodium carbonate, sodium bisulfate, as well as a wide variety of agrochemicals such as glyphosate.

Untreated water enters the apparatus under pressure and at a flow rate of, for example, 1 to 60 gallons per hour for treating a swimming pool. In the embodiment shown in FIG. 3, the water flows underneath and up through the openings in the grate. The chamber can be at an elevated pressure, for example 5-50 psi.

The chamber, its top and bottom, can be made from any type of plastic such as PVC or the like. Preferably, the chamber itself is made of transparent plastic to enable operators to view the operation of the system.

Figure 4:
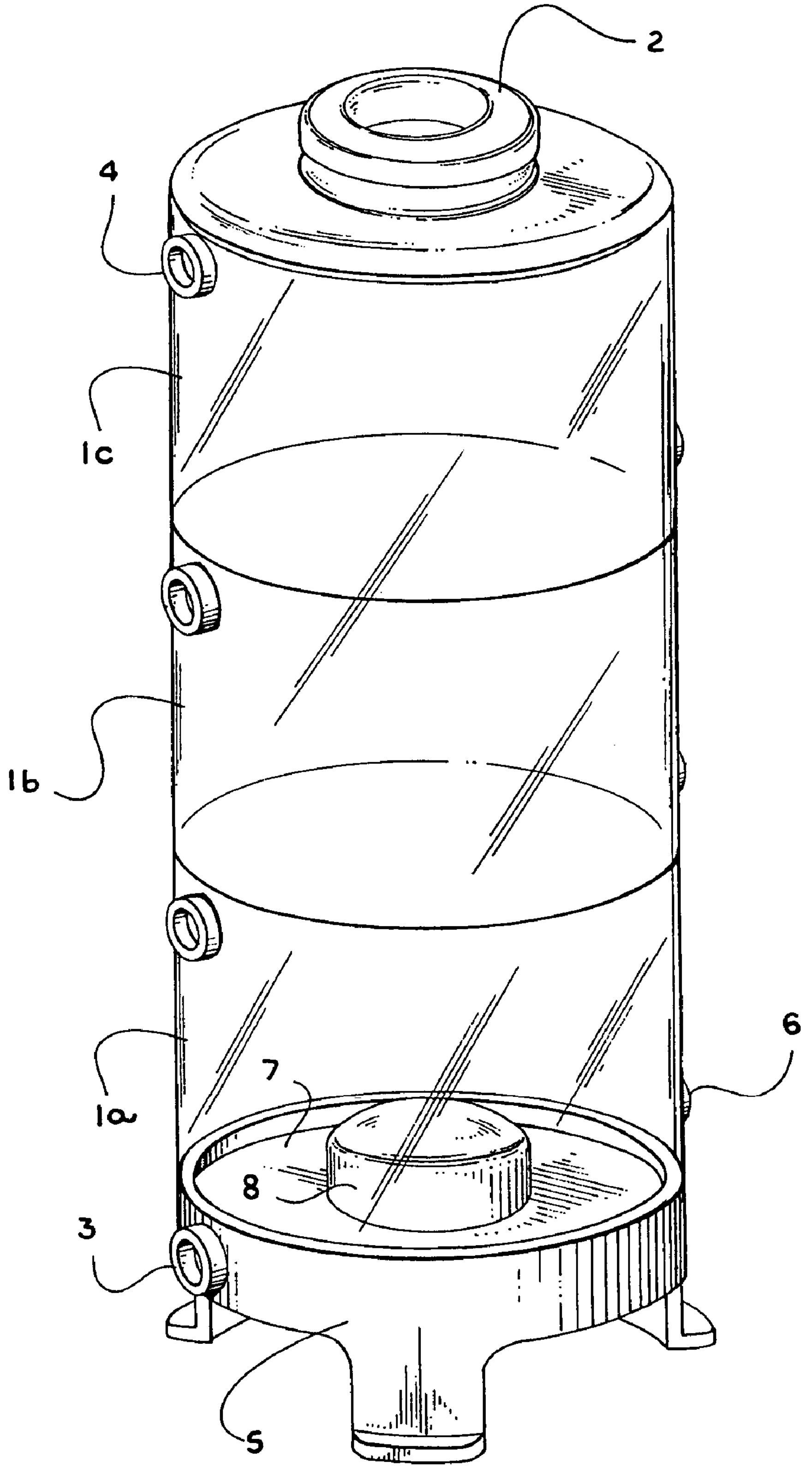
FIG. 4 is a perspective view of an assembly of three chamber units used to create a feeder apparatus of the invention.

In large installations, the units of the invention can be vertically stacked or horizontally arrayed for a larger configuration as shown in FIG. 4. The dimensions of the individual units can also be varied as convenient. In FIG. 4, three chambers 1*a,* 1*b* and 1*c* are vertically arranged and function as heretofore described.

The feeder can feed a variety of products. It is capable of feeding liquids, gels and solids of all types. The solids do not need to be completely soluble. Undissolved material can be removed by either increasing the flow rate sending it into the stream of water, or by draining the tank through opening 6. Some examples of the feeder's capability are: granular or other forms of calcium hypochlorite, trichlor; dichlor, BCDMH, Oxone, CYA, calcium chloride, sodium carbonate, sodium bicarbonate, alum, sodium bisulfate and sodium chloride.

The feeder can also feed blended products, such as the safer blended calcium hypochlorite products, some examples of blended calcium hypochlorite are: a blend calcium hypochlorite with sodium chloride (U.S. Pat. No. 3,793,216) and a blend of hydrated calcium hypochlorite with magnesium sulfate heptahydrate (U.S. Pat. No. 6,638,446).

Further modifications and variations will be apparent to those skilled in the art and are intended to be encompassed by the claims appended hereto.

I claim:

1. A feeder apparatus comprising a plurality of chambers in a vertically stacked arrangement connected to each other with a water tight fit, each of said chambers formed of an upstanding wall, having a water outlet in said upstanding wall, the uppermost chamber having a removable cover, and an opening for charging material into said chamber, the lowermost chamber mounted on a base and having a drain in said wall, said lowermost chamber having a water inlet and a centrally located hub mounted on said base, said hub having a plurality of slits or nozzles for introducing a jet stream of water into the lowermost chamber of said apparatus at its base.

2. The feeder apparatus according to claim 1, wherein each of said plurality of chambers is made of transparent plastic.

3. The feeder apparatus according to claim 1, wherein said cover fits in mating engagement with said uppermost chamber at its top to form a water tight seal.

* * * * *